United States Patent Office 3,640,903
Patented Feb. 8, 1972

3,640,903
HYDROCARBON CONVERSION CATALYST AND METHOD OF MANUFACTURE
Lee Hilfman, Prospect Heights, Ill., assignor to Universal Oil Products Company, Des Plaines, Ill.
No Drawing. Filed Apr. 28, 1969, Ser. No. 819,932
Int. Cl. B01j 11/36, 11/40
U.S. Cl. 252—451
9 Claims

ABSTRACT OF THE DISCLOSURE

A crystalline aluminosilicate is prepared dispersed in a silica matrix. The crystalline aluminosilicate-mother liquor slurry is admixed with an aqueous solution of a salt of a strong acid to precipitate substantially all of the residual alkali metal silicate contained therein as silica.

---

Crystalline aluminosilicates are well-known in the art and descriptions thereof have been published in considerable detail. In general, they comprise silica, alumina and one or more exchangeable cations such as sodium. They are characterized by a three-dimensional network of fundamental structural units consisting of silicon-centered $SiO_4$ and aluminum-centered $AlO_4$ tetrahedra interconnected by the apical oxygen atoms. To effect a chemical balance, each $AlO_4$ tetrahedra has associated therewith the aforementioned exchangeable cation. In most cases, at least a portion of the exchangeable cations are subsequently ion-exchanged with hydrogen cations to yield the hydrogen or active form of the crystalline aluminosilicate. The $SiO_4$ and $AlO_4$ tetrahedra are arranged in a definite geometric pattern often visualized in terms of chains, layers or polyhedra, all formed by the linking of the tetrahedra fundamental structural units. In any case, the effect is a network of cages or cavities interconnected by intracrystalline pores and channels whose narrowest cross-section has essentially a uniform diameter. The various crystalline aluminosilicates may be classed by the geometric pattern of their framework with its attendant pore size, and by the silica/alumina mol ratio of which they are composed.

The crystalline aluminosilicates herein contemplated are the synthetically prepared faujasites generally referred to as "Type X" and "Type Y" crystalline aluminosilicates. Of particular interest is the synthetically prepared "Type Y" crystalline aluminosilicate characterized by a silica/alumina mol ratio in excess of about 3, generally from about 3 to about 7, as opposed to a silica/alumina mol ratio of less than about 3, generally from about 2 to about 3, characteristic of "Type X" crystalline aluminosilicates—the geometric framework or structure of "Type X" and "Type Y" being essentially identical.

Methods of synthesizing said crystalline aluminosilicates are generally well-known. Briefly, a reaction mixture is prepared comprising sodium hydroxide in aqueous solution, sodium aluminate or other suitable alumina precursor, and sodium silicate or other suitable silica precursor including colloidal silica. The reaction conditions, as well as the mol ratio of the reactants, are carefully controlled to precipitate a particular crystalline aluminosilicate product. Typically, the reaction mixture is allowed to digest at ambient temperature up to about 40 hours or more after which it is heated with stirring at a temperature of from about 180° to about 250° F. The mother liquor, comprising residual alkali metal silicate, is then filtered or decanted from the crystalline aluminosilicate solids product which is thereafter washed and dried and recovered as finely divided particles of about 0.05–.5 microns in size.

While the crystalline aluminosilicates are widely recognized for their catalytic value, particularly with respect to hydrocarbon conversion reactions, they frequently exhibit extremely high activity with respect to a particular hydrocarbon conversion reaction and product selectivity is difficult to control. Further, the crystalline aluminosilicate product per se is difficult to agglomerate into larger particles and the extremely fine particle size is unsuitable for a fixed, fluidized or moving bed type of operation. It has thus become the practice to disperse the finely divided crystalline aluminosilicate particles in an amorphous siliceous gel matrix to effect a dilution of activity and/or to effect a larger particle size more amendable to agglomeration as by pilling, pelleting, and the like.

It is an object of this invention to provide a novel process for the manufacture of a catalytic composite comprising a faujasite dispersed in an amorphous silica matrix.

It is a further object to present a novel process for dispersing a faujasite in an amorphous silica matrix whereby the faujasite is employed admixed with its mother liquor.

It is still another object to utilize the mother liquor as a source of amorphous silica.

SUMMARY

In one of its broad aspects, this invention embodies a process for the manufacture of a crystalline aluminosilicate dispersed in a silica matrix which comprises preparing a faujasite dispersed in its mother liquor, admixing the faujasite-mother liquor slurry with an aqueous solution of a salt of a strong acid to form a mixture having a pH of from about 9 to about 11 and precipitating substantially all of the residual alkali metal silicate contained therein, and washing and drying the solids product to form a composite of said faujasite dispersed in a silica matrix. Other objects and embodiments of this invention will become apparent in the following detailed specification.

The faujasites herein contemplated are crystalline aluminosilicates substantially as described. They are further characterized by a crystalline form frequently described as a truncated octehedra with pore openings in the range of from about 6 to about 15 Angstroms. The faujasites can be represented in terms of mol ratios of oxides in the following manner:

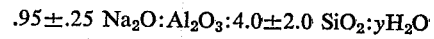

Wherein y is a number up to about 8. One preferred embodiment relates to the manufacture of "Type Y" faujasite, said faujasite being characterized by a silica-alumina mol ratio of at least about 3 and represented in terms of oxide mol ratios as follows:

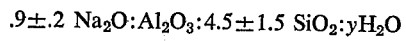

The faujasite may be prepared dispersed in its mother liquor in any conventional or otherwise convenient manner. For example, one preferred method of preparation comprises forming an aqueous solution of sodium aluminate and sodium hydroxide and a reactive amorphous silica. Suitably, the amorphous silica reactant may be fume silica, chemically precipitated silica, a precipitated silica sol, and such silicas as are described by the tradenames "Hi-Sil," "Cab-O-Sil" and the like. The resulting reaction mixture preferably comprises a mol ratio of $Na_2O$ to $SiO_2$ of at least about 0.3 and generally not in excess of about 0.8. Sodium aluminate comprising a mol ratio of $Na_2O$ to $Al_2O_3$ of about 1.5 is suitably employed as a reactant. The selected silica source and the sodium aluminate solution are employed in amounts such that the mol ratio of silica to alumina in the reaction mixture is from about 6 to about 20. Thus, the reaction mixture preferably is a composition which may be expressed as a mixture of oxides as follows: $SiO_2$ to $Al_2O_3$ in a mol ratio of from about 6 to about 20, Na$_2$O to SiO$_2$ in a mol ratio of from about 0.3 to about 0.8, and H$_2$O to Na$_2$O in a mol ratio of from about 25 to about 60. In any case, the reaction mixture is heated, usually at a temperature of from about 65° to about 245° F., and preferably at about 212° F., in a closed vessel to avoid water loss.

In accordance with the process of this invention, the faujasite-mother liquor slurry is admixed with an aqueous solution of a salt of a strong acid to form a mixture having a pH of from about 9 to about 11 whereby substantially all of the residual alkali metal silicate contained in the mother liquor is precipitated as silica. Suitable salts thus include the soluble salts of sulfuric, nitric and hydrochloric acids, particularly the ammonium salts thereof, for example, ammonium sulfate, ammonium nitrate, ammonium chloride, ammonium bromide, etc. Other salts of strong acids such as aluminum sulfate, aluminum hydrate, aluminum chloride, and the like, are also suitably employed.

The solids product thus produced is separated from the reaction mixture, suitably by filtration, water-washed and dried. One convenient method comprises recovering the solids product as a filter cake which is then reslurried in water to a smooth consistency and subjected to spray drying. Thus, the aqueous slurry is sprayed in an atomized state into an atmosphere of hot inert gases to effect a rapid evaporation of moisture so that the dried particles of predetermined size range fall out of the spray, if so desired, the aforesaid filter cake can be water-washed to concentrate and partially remove soluble matter prior to spray-drying. Alternatively, the spray-dried material can be reslurried and subjected to one or more water-washings to reduce the soluble matter to an acceptable level.

The spray-dried solids product has superior pilling and flow characteristics attributed to moisture content and particle size distribution. The spray-dried particles may be introduced directly to a pilling machine without extraneous lubricant or binder. The pilling machines are suitably adjusted to produce pellets of from about 2 to about 20 pounds crushing strength, although from about 5 to about 10 pounds is sufficient to permit handling and use in a commercial operation while retaining a porous structure conductive to high surface area for catalytic purposes.

Alternatively, the spray-dried solids product may be commingled with a temporary binder such as polyvinylalcohol or Sterotex in quantities of from about 1 to about 10 wt. percent. This temporary binder is a useful aid in pilling in commercial production where spray-drying conditions are not as carefully controlled. The spray-dried particles containing temporary binder are formed into particles of desired size and shape by methods such as pilling, extrusion, etc. Upon subsequent calcination, preferably at a temperature of from about 800° to about 1200° F. in an air atmosphere, the temporary binder is burned from the shaped particles.

The washed and dried solids product is subsequently treated in contact with an ion-exchange solution containing ions capable of replacing alkali metal cations, preferably an ammonium salt solution, to remove substantially all of the sodium or other alkali metal cations. The faujasite thus prepared dispersed in a silica matrix is particularly useful as a catalyst in conjunction with a metal of Group VI-B and/or Group VIII. These metals may be composited with the pelleted crystalline aluminosilicate preferably in its ammonium form, by impregnation and/or ion exchange techniques. The ammonium form can thereafter be converted to the hydrogen or active form upon subsequent calcination. Preferably, the metals concentration is from about 0.5 to about 20 wt. percent with respect to the non-noble metals of Group VIII e.g., nickel, iron and cobalt, and from about 0.5 to about 3 wt. percent with respect to the noble metals, e.g., platinum, palladium, etc. Group VIII metals composited with the pelleted crystalline aluminosilicate represent a preferred catalyst in promoting hydrocarbon conversion reactions, especially those involving the so-called carbonium ion mechanism such as isomerization, alkylation, hydrocracking, etc. Other specific metals components which may be employed include molybdenum, tungsten, chromium, manganese, etc.

As heretofore mentioned, the Group VI-B and/or Group VIII metal component can be composited with the crystalline aluminosilicate in any suitable manner including impregnation and ion-exchange. Preferably, the pellets are soaked, dipped, suspended or otherwise immersed in an aqueous solution comprising a soluble compound of a metal of Group VI-B and/or Group VIII. Suitable compounds of Group VI-B metals include ammonium molybdate, ammonium paramolybdate, molybdic acid, molybdenum trioxide, ammonium chromate, ammonium peroxychromate, chromium acetate, chromous chloride, chromium nitrate, ammonium metatungstate, tungstic acid, etc. Suitable soluble compounds of Group VIII metals include nickel nitrate, nickel sulfate, nickel chloride, cobaltous nitrate, cobaltous sulfate, ferric nitrate, ferric sulfate, platinum chloride, chloroplatinic acid, chloropalladic acid, palladium chloride, etc. of the Group VIII metals, nickel is preferred.

The final catalyst composite, after all of the catalytic components are present therein, is dried and oxidized in an oxygen-containing atmosphere, such as air, at a temperature of from about 800° to about 1500° F. for a period of from about 1 to about 8 hours or more.

When employed as a hydrocracking catalyst, preferably hydrocracking conditions comprise a liquid hourly space velocity of from about 0.3 to about 10, a pressure of from about 850 to about 2500 p.s.i.g., a temperature of from about 400° to about 900° F. and a hydrogen to charge stock ratio of from about 3,000 to about 15,000 s.c.f./bbl. Suitable charge stock comprise heavier petroleum fractions such as gas oils, cycle oils, metal distillates, kerosenes, naphthas and the like.

The following example is presented in illustration of the method of manufacture of this invention and is not intended as an undue limitation of the generally broad scope of the invention as set out in the appended claims.

EXAMPLE I

In the preparation of the faujasite dispersed in its mother liquor, 348.6 grams of sodium aluminate was dissolved in 1672 grams of a 30 wt. percent aqueous sodium hydroxide solution and the resulting solution cooled to about room temperature. The cooled solution was then added to a rapidly stirred aqueous colloidal solution comprising 958 grams of silica (Hi-Sil 233) suspended in 2800 cubic centimeters of water. This reaction mixture was stirred for about 18 hours at room temperature, heated at 210° for an additional 24 hours without stirring, and then cooled to about room temperature. A small sample was filtered and washed free of soluble matter. The product analyzed 24.74 Al$_2$O$_3$, 61.51% SiO$_2$ and 13.40% Na$_2$O. X-ray analysis identify the product as 100% faujasite with a SiO$_2$/Al$_2$O$_3$ ratio of 4.24.

About 2500 cubic centimeters of a 28% aqueous ammonium sulfate solution was slowly added to 4472 grams of the faujasite-mother liquor slurry with constant stirring, the final pH of the mixture being about 10. The mixture was filtered and the filtrate checked for complete precipitation. The solids product was water-washed free of soluble matter, dried at about 215° F. for 3 hours, and formed into pellets of about ⅛" diameter. The pellets were determined to comprise 57 wt. percent faujasite and 43 wt. percent amorphous silica.

The sodium content of the pellets was thereafter reduced to about 0.38% (calculated as Na$_2$O) by ion-exchange. The pellets were treated in contact with an ion-exchange solution comprising 1620 grams of ammonium chloride in 5 gallons of water adjusted to a pH of 8.5 with a 28% aqueous ammonia solution. The ion-exchange was effected at 200° F. over a 16 hour period in a continuous flow system. After the ion-exchanged pills were washed chloride-free with water, they were dried at 300° F. for 2 hours.

A portion of the pellets (57.7 grams) was impregnated with 13.73 grams of nickel nitrate hexahydrate in aqueous solution. The impregnated pellets were thereafter dried and calcined in air at 900° F. for 2 hours. The calcined pellets were then reduced and sulfided in contact with a gas blend comprising a 10:1 $H_2/H_2S$ mol ratio at 775° F. for 4 hours. The catalyst contained 4.9% nickel.

I claim as my invention:

1. A process for the manufacture of a crystalline aluminosilicate dispersed in a silica matrix which comprises:
   (a) preparing a faujasite dispersed in its mother liquor;
   (b) forming a mixture consisting essentially of said faujasite-mother liquor slurry and an aqueous solution of a salt of a strong acid, said mixture having a pH of from about 9 to about 11, and thereby preciptating substantially all of the residual alkali metal silicate contained therein as silica;
   (c) washing and drying the solids product to form a composite of said faujasite dispersed in a silica matrix.

2. The process of claim 1 further characterized with respect to step (a) in that said faujasite is prepared dispersed in its mother liquor by forming a reaction mixture whose composition expressed in terms of oxide mol ratios falls in the range $SiO_2/Al_2O_3$ from 6 to 20
   $Na_2O/SiO_2$ from 0.3 to 0.7
   $H_2O/Na_2O$ from 25 to 60 maintaining the reaction mixture at a temperature of from about 65° to about 245° F. for a period of time sufficient to precipitate said faujasite from its mother liquor.

3. The process of claim 1 further characterized with respect to said step (b) in that said aqueous solution of a salt of a strong acid is an aqueous ammonium sulfate solution.

4. The process of claim 1 further characterized with respect to step (c) in that the washed and dried solids product is treated in contact with an ion-exchange solution containing ions capable of replacing alkali metal cations.

5. The process of claim 4 further characterized in that the solids product treated in contact with an ion-exchange solution is further treated in contact with an impregnating solution comprising a soluble compound of at least one metal of Groups VI-B and VIII.

6. The process of claim 5 further characterized in that said impregnating solution comprises a soluble compound of a metal of Group VIII.

7. The process of claim 5 further characterized in that said impregnating solution comprises a soluble nickel compound.

8. The process of claim 1 further characterized in that said salt of a strong acid is an aluminum or ammonium salt.

9. The process of claim 8 further characterized in that said salt is an ammonium salt.

References Cited

UNITED STATES PATENTS

| | | | |
|---|---|---|---|
| 3,207,701 | 9/1965 | Curtin | 252—451 |
| 3,275,571 | 9/1966 | Mattox | 252—451 |
| 2,933,456 | 4/1960 | Braithwaite | 252—451 |
| 3,503,874 | 3/1970 | Michalko | 252—455 X |

DANIEL E. WYMAN, Primary Examiner

C. F. DEES, Assistant Examiner

U.S. Cl. X.R.

252—455 Z